(No Model.)
T. A. EDISON.
ELECTRICAL TRANSMISSION OF POWER.
No. 370,130. Patented Sept. 20, 1887.
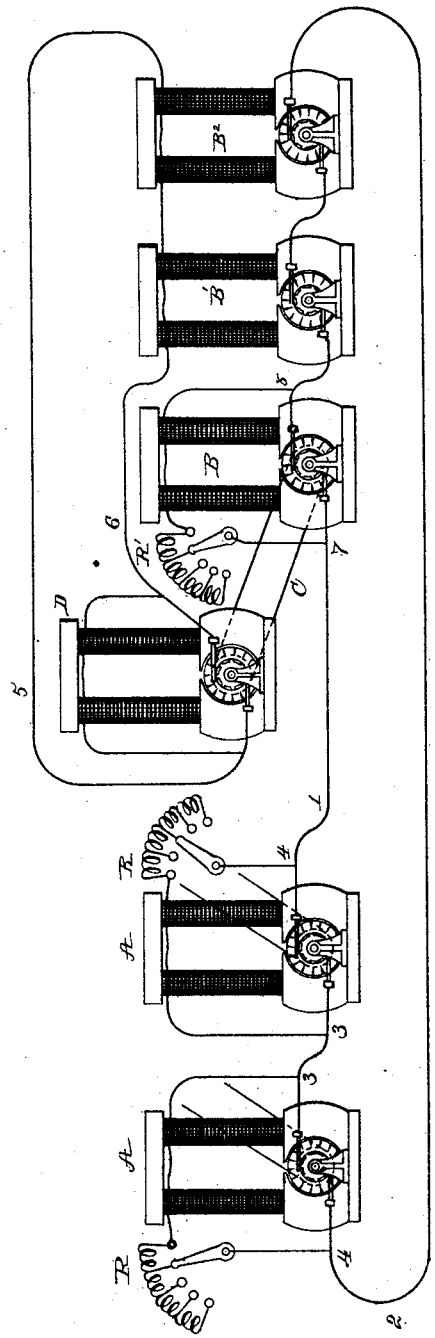
ATTEST:
Edward C. Rowland
H. W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,130, dated September 20, 1887.

Application filed June 7, 1883. Serial No. 97,330. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 572,) of which the following is a specification.

This invention relates to the operation of independent electro-dynamic motors, (that is, a number of separate motors not mounted upon the same driving-shaft, as in my Patent No. 248,435.)

My object is to enable all the motors of a series to be regulated simultaneously from a common point and in a simple and effective manner. In my application Serial No. 97,329 a series of motors is shown with the field-magnets thereof energized from a local mechanical source of power. In the present invention I desire to do away with this additional power, while at the same time I provide a separate regulable supply of current to the fields.

The invention consists in the employment of a local electrically-operated source of electricity for energizing the fields of the independent electro-dynamic motors, whose armatures are placed, preferably in series, in a circuit leading from one or more dynamo or magneto electric machines placed at a distance.

In carrying out the invention I connect one of the motors of the series by a belt or otherwise with a dynamo or magneto electric machine, and in the circuit of this machine I include the field-coils of all the other motors of the series. The motor used to operate the exciting-machine preferably has its field-coils in a shunt-circuit from the main line, and an adjustable resistance is placed in said shunt to regulate the speed of the motor, and consequently that of the exciting-machine and the current supplied to the fields of the other motors. The generators employed to operate the series of motors, if more than one are used, are preferably placed in series to generate a current of high tension. Their fields are energized, preferably, by shunt-circuits from the main line, and an adjustable resistance is placed in each shunt; or other means are provided for regulating the generation of current by the machines, either separately or simultaneously.

The invention is illustrated diagrammatically in the annexed drawing.

A A represent any desired number of dynamo-electric machines connected in series, from which main conductors 1 2 extend. The field-coils of each machine are in a shunt-circuit, 3 4, and each shunt contains an adjustable resistance, R, for regulating the generation of current by the machine.

Independent electro-dynamic motors B B' B² are connected in series in the main circuit 1 2. From the armature-shaft of motor B a belt, C, extends to dynamo-electric machine D. From the generator D a circuit, 5 6, extends, including the field-coils of the motors B' B².

It is evident that any desired number of motors may be placed in series; that, if desired, more than one of them may be employed for driving exciters, and that more than one exciter may be employed for the fields of the working motors.

The field of the motor B is in a shunt-circuit, 7 8, which contains an adjustable resistance, R', by means of which the speed of the motor and of the exciter driven thereby is regulated, and the speed and power of all the motors of the series are thus regulated simultaneously by a single operator.

The field-circuit of the exciter D is a shunt from its own main circuit 5 6. This does not require a regulating-resistance, as the resistance R' answers the purpose.

What I claim is—

1. The combination, with one or more dynamo or magneto electric machines and two or more mechanically-independent electro-dynamic motors connected therewith, of a local electrically-operated source of electricity for energizing the fields of said motors, substantially as set forth.

2. The combination, with one or more dynamo or magneto electric machines and two or more mechanically-independent electro-dynamic motors arranged in series connected therewith, of a local electrically-operated source of electricity for energizing the fields of said motors, substantially as set forth.

3. The combination, with one or more dynamo or magneto electric machines, of two or more mechanically-independent electro-dynamic motors connected therewith, and one or more other dynamo or magneto electric machines operated by one or more of said motors for energizing the field of the other motor or motors, substantially as set forth.

4. The combination, with one or more dynamo or magneto electric machines, of two or more mechanically-independent electro-dynamic motors connected therewith, one or more of said motors having their fields in a shunt or shunts from the main line and operating one or more dynamo or magneto electric machines for energizing the fields of the other motors, substantially as set forth.

This specification signed and witnessed this 1st day of June, 1883.

THOS. A. EDISON.

Witnesses:
H. W. SEELY,
EDWARD H. PYATT.